United States Patent

Pollmann et al.

[11] Patent Number: 5,615,861
[45] Date of Patent: Apr. 1, 1997

[54] THROTTLE DEVICE FOR AN INTERNAL COMBUSTION ENGINE

[75] Inventors: Herbert Pollmann; Wolfgang Hodulik, both of Karlstein, Austria; Klaus-Jürgen Peters, Affalterbach, Germany; Karl Gmelin, Flein, Germany; Matthias Entenmann, Bietigheim-Bissingen, Germany; Peter Ropertz, Möglingen, Germany

[73] Assignee: Robert Bosch GmbH, Stuttgart, Germany

[21] Appl. No.: 448,478

[22] PCT Filed: Oct. 4, 1994

[86] PCT No.: PCT/DE94/01183

§ 371 Date: Jun. 6, 1995

§ 102(e) Date: Jun. 6, 1995

[87] PCT Pub. No.: WO95/09978

PCT Pub. Date: Apr. 13, 1995

[30] Foreign Application Priority Data

Oct. 7, 1993 [DE] Germany .......................... 43 34 180.2

[51] Int. Cl.⁶ ..................................................... F16K 1/22
[52] U.S. Cl. ........................... 251/306; 251/358; 123/403
[58] Field of Search ................................. 251/306, 358; 123/337, 403

[56] References Cited

U.S. PATENT DOCUMENTS

| 3,233,861 | 2/1966 | Stillwagon | 251/358 X |
| 5,131,626 | 7/1992 | Kobayashi | 251/305 |

*Primary Examiner*—John C. Fox
*Attorney, Agent, or Firm*—Edwin E. Greigg; Ronald E. Greigg

[57] ABSTRACT

A throttle device having a throttle-flap connection piece which is produced from plastic. For an efficient production of the throttle-flap connection piece form plastic in the plastic injection-molding technique, it is necessary to avoid undesirable shrinkage in the pivoting region of the throttle flap and to seal off the bearing arrangements against penetrating plastic during the injection operation. The throttle device includes an annular insertion part which is arranged in the pivoting region of the throttle flap and which, connected to the bearing arrangements is embedded into the throttle-flap connection piece made form plastic, in order to protect the bearing arrangement against penetrating plastic. The injected-round insertion part is suitable for throttle devices which are made from plastic and which are provided for mixture-compressing spark-ignition or air-compressing auto-ignition internal-combustion engines.

14 Claims, 4 Drawing Sheets

THROTTLE DEVICE FOR AN INTERNAL COMBUSTION ENGINE

STATE OF THE ART

The invention proceeds from a throttle device for an internal combustion engine. There is already a known throttle device (German Offenlegungsschrift 4,022,826), in which an actuating shaft is connected fixedly in terms of rotation to a throttle member, for example to a throttle flap which is rotated by means of an actuating drive. The actuating shaft is mounted on both sides in a throttle-flap connection piece of the throttle device, for which purpose receiving orifices, into which the bearing arrangements, for example in the form of needle bearings, are inserted, are worked out from the throttle-flap connection piece. When the throttle device is made from aluminum in the die-casting technique, a careful remachining of the receiving orifices extending into the vicinity of the throttle flap is necessary in order to fit the bearing arrangements exactly without any tilting. It has therefore already been proposed to produce the throttle-flap connection piece from plastic by the injection-molding process. The advantage of such throttle-flap connection pieces consisting of plastic is that they are lighter than aluminum housings, that the production material is cheaper and that inserts, for example inserts provided with threaded bores or inserts designed as rolling bearings for the mounting of the throttle member, can be pressed into orifices formed at the same time during the injection-molding operation, so that remachining can be reduced to a minimum. The disadvantage of such throttle-flap connection pieces consisting of plastic is that they shrink during and after the injection molding and warp after removal from the mold, and that, furthermore, they have poor dimensional stability under the effect of temperature and force. It must be remembered, here, that the engine compartment of a motor vehicle and therefore also the throttle device or the throttle-flap connection piece are subject to high temperature fluctuations, since, on the one hand, temperatures of well below zero can occur in the open in winter when the motor vehicle is parked and, on the other hand, temperatures of more than 120° C. can occur when the motor vehicle is running, particularly on hot summer days, and after the internal-combustion engine has been switched off. For these reasons, there is no guarantee of dimensional stability of the suction wall of such throttle-flap connection pieces consisting of plastic. However, such dimensional stability is necessary, so that each position of the pivotable throttle member corresponds to an exactly defined throughflow cross section and, above all, so that a minimum exactly defined residual gap or a complete shut-off is possible in an end position of the throttle member. For reasons of environmental protection and to reduce the fuel consumption, very low idling speeds of the internal-combustion engine are demanded today, the throttle member assuming an idling position in which only a small air quantity may flow past the throttle member. It is therefore particularly important that the suction wall of the throttle-flap connection piece of the throttle device should maintain its dimensional stability even over many years of operation, particularly in the region of the so-called idling position of the throttle member, in order to guarantee a readjustment of the throttle member by means of a uniformly small gap width. A further disadvantage is that the position and axial alignment of the bearings for the throttle member also vary, for example as a result of the temperature fluctuations, and this can lead to a jamming of the throttle member. Where use in motor vehicles is concerned, a jamming would mean that the engine revolutions and the speed can no longer be influenced by the driver.

ADVANTAGES OF THE INVENTION

In contrast to this, the advantage of the throttle device according to the invention is that, even in a design of the throttle-flap connection piece made of plastic, a high dimensional stability of the suction wall of the throttle-flap connection piece is guaranteed in a simple way and an advantageous incorporation of the bearing arrangements into the throttle-flap connection piece, particularly during the injection-molding operation, is displayed. The strap faces bearing against the bearing end faces prevent plastic material from penetrating during the injection-molding operation into the bearing arrangements designed as rolling bearings.

Advantageous developments and improvements of the throttle device specified in the main claim are possible as a result of the measures listed hereinafter.

By virtue of the connection of the bearing arrangements to the insertion part, these can be inserted together into the injection-molding device and be injected around without further fixing. The design of gutter-shaped depressions in the form of beads on the insertion part has the advantage that a creeping along the surface of the insertion part during the injection-molding operation and in the cooling phase and thereafter is effectively prevented and the dimensional stability of the throttle-flap connection piece and the roundness of the suction wall are improved. The inclination of the insertion part in the direction of the idling position of the throttle flap affords the advantage that the suction wall maintains high dimensional accuracy during the entire lifetime in this very region.

BRIEF DESCRIPTION OF THE DRAWING

An exemplary embodiment of the invention is shown in simplified form in the drawing and is explained in more detail in the following description.

DESCRIPTION OF THE EXEMPLARY EMBODIMENT

Figure 1:
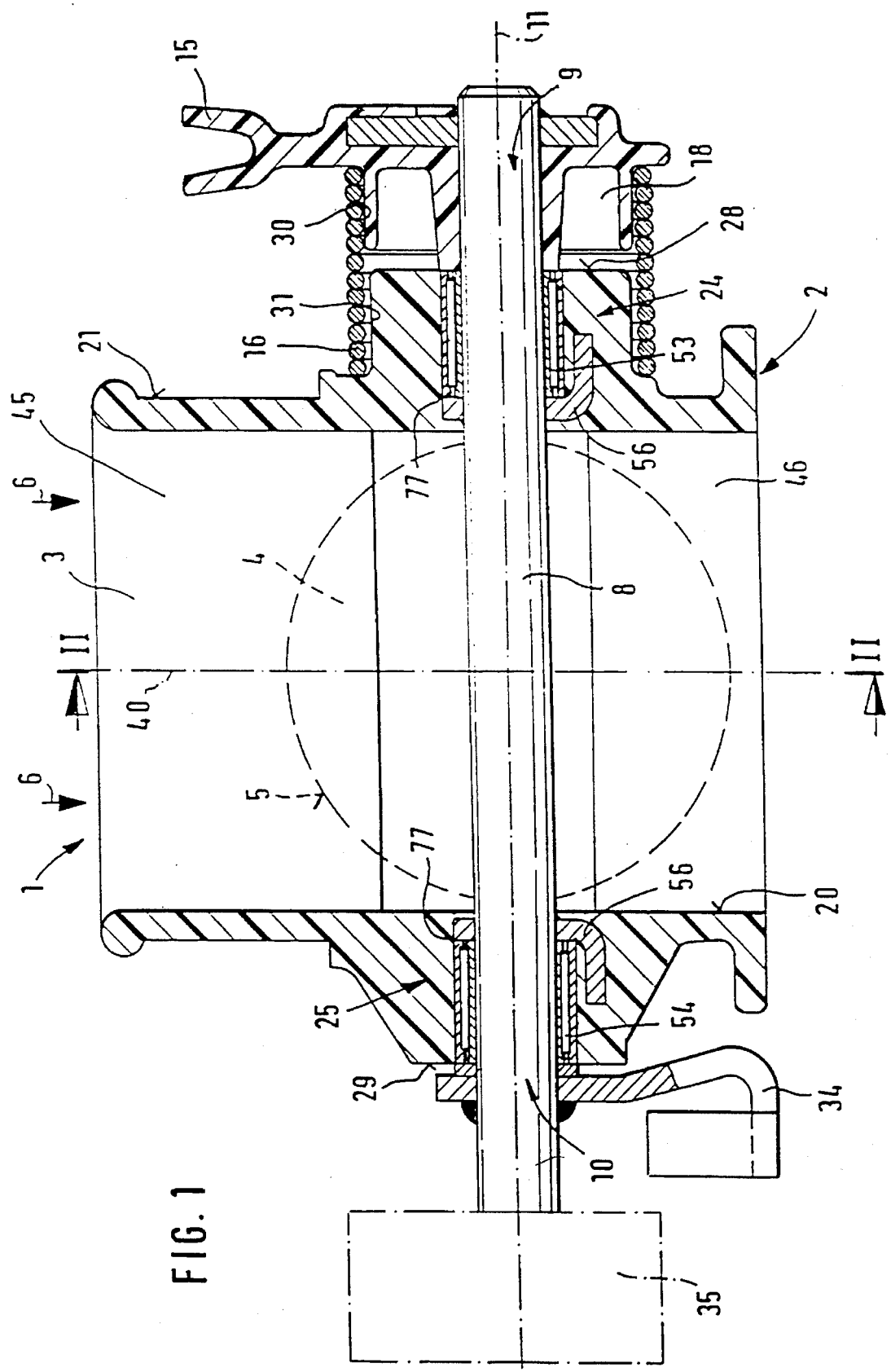
FIG. 1 shows a section through a throttle device designed according to the invention.

FIG. 1 shows a throttle device 1 which serves for controlling the performance of a mixture-compressing spark-ignition or air-compressing auto-ignition internal-combustion engine. The throttle device 1 has a throttle-flap connection piece 2, in which a throttle member, for example a throttle flap 4, is introduced rotatably in a suction duct 3. The throttle flap 4 controls to a greater or lesser extent the air quantity, or an inflowing fuel/air mixture, flowing into the throttle-flap connection piece 2 via a suction pipe. Downstream of the throttle flap 4, the throttle-flap connection piece 2 is connected to a combustion space of the internal-combustion engine, for example by means of a connecting conduit. The direction of flow is identified by arrows 6 in FIGS. 1, 2 and 4. For the rotation of the throttle flap 4, an actuating shaft 8 is connected fixedly in terms of rotation to the throttle flap 4. In FIG. 1 and in FIG. 2, the throttle flap 4 is indicated by broken lines. A representation of the fastening of the throttle flap 4 to the actuating shaft 8 is dispensed with, since the average person skilled in the art can infer this from the state of the art. The actuating shaft 8 extends transversely through the throttle-flap connection piece 2 centrically relative to an axis of rotation 11 of the throttle flap 4. At the same time, the actuating shaft 8 passes on two sides through a suction wall 20 of the throttle-flap connection piece 2 and is pushed rotatably into two sleeve-shaped receiving widenings 24, 25 of an outer wall 21 of the throttle-flap connection piece 2 which are arranged coaxially relative to the axis of rotation 11 of the actuating shaft 8 and which are designated below as an actuating part 24 and a measuring part 25. Provided for mounting the actuating shaft 8 are at least two bearing arrangements 53 and 54 which are designed, for example, in the form of a rolling bearing, especially needle bearing, or of a sliding bearing. The bearing arrangement 53 is accommodated in the sleeve-shaped actuating part 24 located on the right in FIG. 1 and the bearing arrangement 54 is accommodated in the sleeve-shaped measuring part 25 located on the left in FIG. 1. The actuating shaft 8 projects with a first actuating-shaft end 9 beyond an annular outer face 28 of the actuating part 24. An actuator 15 is pushed onto the first actuating-shaft end 9 by means of a part 18 formed on in a sleeve-shaped manner and is connected to the actuating shaft 8, for example by means of a welded joint. A restoring spring 16 wound on an outer wall 30 of the sleeve-shaped part 18 of the actuator 15 and on an outer wall 31 of the sleeve-shaped actuating part 24 serves primarily for generating a restoring force in the closing direction of the throttle flap 4 and additionally for the return of a linkage or Bowden pull not shown in more detail with the actuator 15. The linkage or Bowden pull is connected, for example, to an accelerator pedal which, when operated, causes the throttle flap 4 to rotate in the opening direction in order to control the performance of the internal-combustion engine. Opposite the actuating part 24, the actuating shaft 8 projects with its second actuating-shaft end 10, shown on the left in FIG. 1, beyond an annular outer face 29 of the measuring part 25. For electronic idling control or engine-performance control, an articulated lever 34 at the second actuating-shaft end 10 can be connected to the actuating shaft 8 by means of a welded joint, so as to be operated by a throttle-flap adjusting motor which is itself activated by a control unit. For the transmission of electrical signals and for monitoring, there is a rotary-angle transmitter 35 which is represented by dot-and-dash lines in FIG. 1 and which measures a rotation of the throttle flap 4 at the second actuating-shaft end 10.

Figure 2:
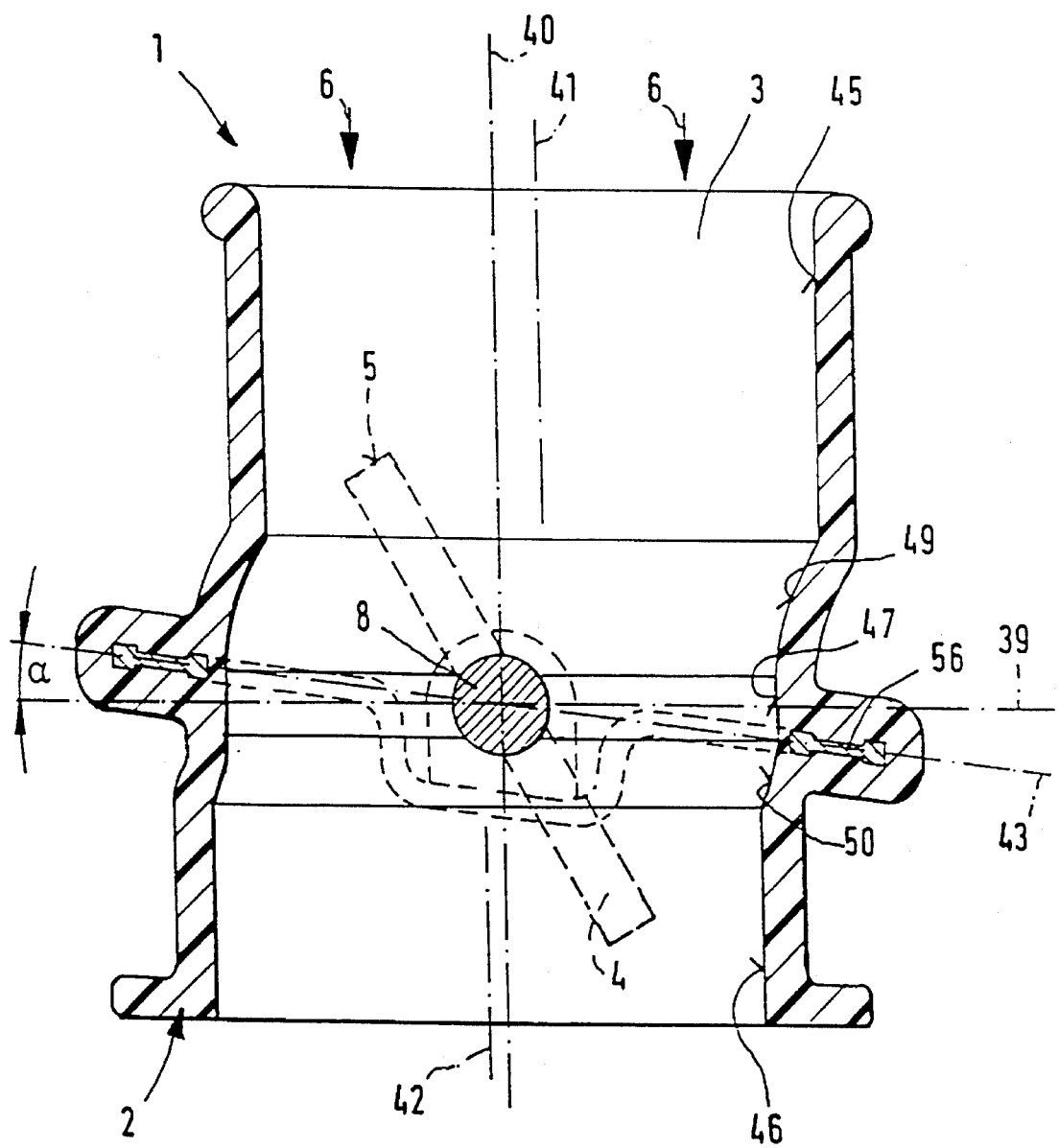
FIG. 2 is a section along a line II—II in FIG. 1.

In the exemplary embodiment, the suction duct 3 of the throttle-flap connection piece 2 has a special design, in order to improve the throttle characteristic particularly in the idling range of the throttle flap 4. FIG. 1 shows a section through the throttle-flap connection piece 2, in which the suction wall 20 of the suction duct 3 runs rectilinearly parallel to a flow axis 40 oriented in the direction of flow 6. The flow axis 40 is oriented transversely relative to the axis of rotation 11 and divides the suction duct 3 of FIG. 1 symmetrically. FIG. 2 shows a second section through the throttle-flap connection piece 2 which is rotated through 90 degrees about the flow axis 40 in relation to the section of FIG. 1. At the same time, a cylindrical inflow portion 45 located upstream of the throttle flap 4 and having a central inflow axis 41 is arranged offset to the right in FIG. 2 relative to a cylindrical throttle portion 47 located downstream and arranged centrally relative to the flow axis 40. A horizontal axis 39 extending transversely relative to the flow axis 40 and transversely relative to the axis of rotation 11 divides the cylindrical throttle portion 47 symmetrically in the direction of flow 6. A cylindrical flow-off portion 46 located downstream of the throttle portion 47 having the throttle flap 4 is arranged with a central flow-off axis 42 offset to the left in FIG. 2 in relation to the flow axis 40. A first connecting portion 49 serves as a transition from the inflow portion 45 to the throttle portion 47, and a second connecting portion 50 serves as a transition from the cylindrical throttle portion 47 to the flow-off portion 46. The connecting portions 49, 50 have an arcuate wall which, in each sectional plane spanned by its axis of rotation 11 and horizontal axis 39, has a circular shape. The connecting portions 49, 50 extend in a tubularly curved manner, so that the representation of the limiting contour in FIG. 2 of the first connecting portion 49, throttle portion 47 and second connecting portion 50 shows an S-shape. The described embodiment of the suction duct 3 offset cylindrically in the direction of flow 6 ensures that, particularly in the region of the idling position and part-load position of the throttle flap 4, in the event of increasing angles of adjustment, only a dimensionally accurate rise in the idling air quantity takes place, that is to say a sensitive adjustment which can be influenced by the constructive shaping of the two arcuate connecting portions 49 and 50.

Figure 5:
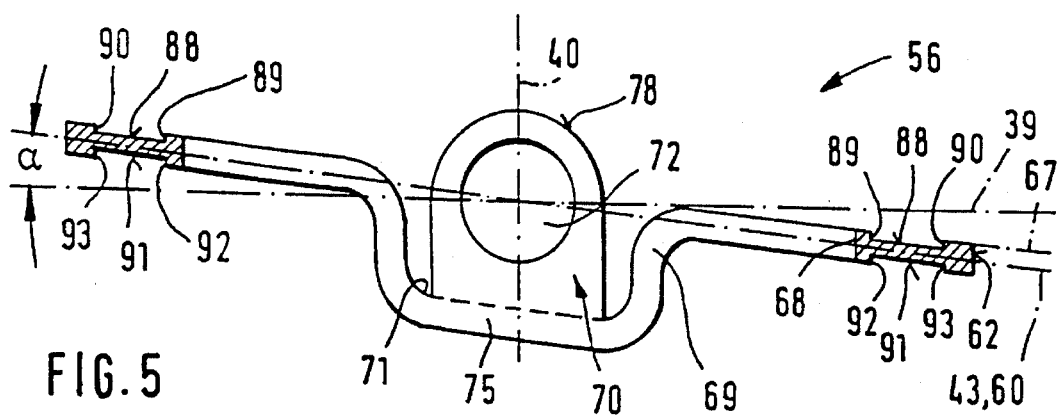
FIG. 5 is a section along a line V—V in FIG. 3.

In the idling position, the throttle flap 4 is inclined at an angle of inclination $\alpha$ of approximately 4 to 8 degrees about the axis of rotation 11. The angle of inclination $\alpha$ entered in FIGS. 2 and 5 is limited by the horizontal axis 39 and an axis of adjustment 43 of the throttle flap 4, the axis of adjustment 43 being oriented in line with the mid-plane of the throttle flap 4. The angle of inclination $\alpha$ is dependent on the desired idling air quantity in the idling mode of the internal-combustion engine. For a close fit and to avoid jamming when the throttle flap 4 is in the closing position, the latter has an elliptic shape, a representation of a projection of the throttle flap 4 in a plane spanned by the horizontal axis 39 and axis of rotation 11 giving a circular cross section.

In order to produce the throttle-flap connection piece 2 in the plastic injection-molding technique with precise roundness at least in the throttle portion 47, it is necessary to stiffen the latter in the pivoting region and particularly in the idling range of the throttle flap 4, so that as small a clear gap as possible between an outer cylindrical surface 5 of the throttle flap 4 and the cylindrical throttle portion 47 is achieved by means of a uniform roundness. There is used for this purpose an insertion part 56 which is inserted into the injection-molding device during the production of the throttle-flap connection piece 2 and which is injected around with plastic during the injection-molding operation, during the cooling the insertion part 56 avoiding an undesirable shrinkage of the plastic in the injected-round region of the insertion part 56, so that a suction wall 20 designed with very narrow tolerances and having precise roundness can be produced. In the exemplary embodiment, the insertion part 56 is injected into the throttle-flap connection piece 2 made from plastic in alignment with the axis of adjustment 43 having the angle of inclination $\alpha$ of approximately 4 to 8 degrees, in order to acquire a clear radial gap clearance of the order of magnitude of a few μm in the important region of the idling position of the throttle flap 4.

The insertion part 56 can be made circular, but, in the exemplary embodiment, has an elliptic shape coinciding essentially with a sectional contour of the suction duct 3 which is obtained by the intersection of the suction duct 3 with a plane spanned by the axis of adjustment 43 and the axis of rotation 11 and, in the exemplary embodiment, inclined at the angle of inclination $\alpha$. The insertion part 56 has an annular shape with an elliptic passage orifice 61, in order to be injected into the throttle-flap connection piece 2 with an approximately uniform clearance between an inner cylindrical surface 68 of the insertion part 56 and the suction wall 20, the cross section of the passage orifice 61 being made larger than the orifice cross section of the suction duct 3 in the plane spanned by the axis of adjustment 43 and axis of rotation 11.

Figure 3:
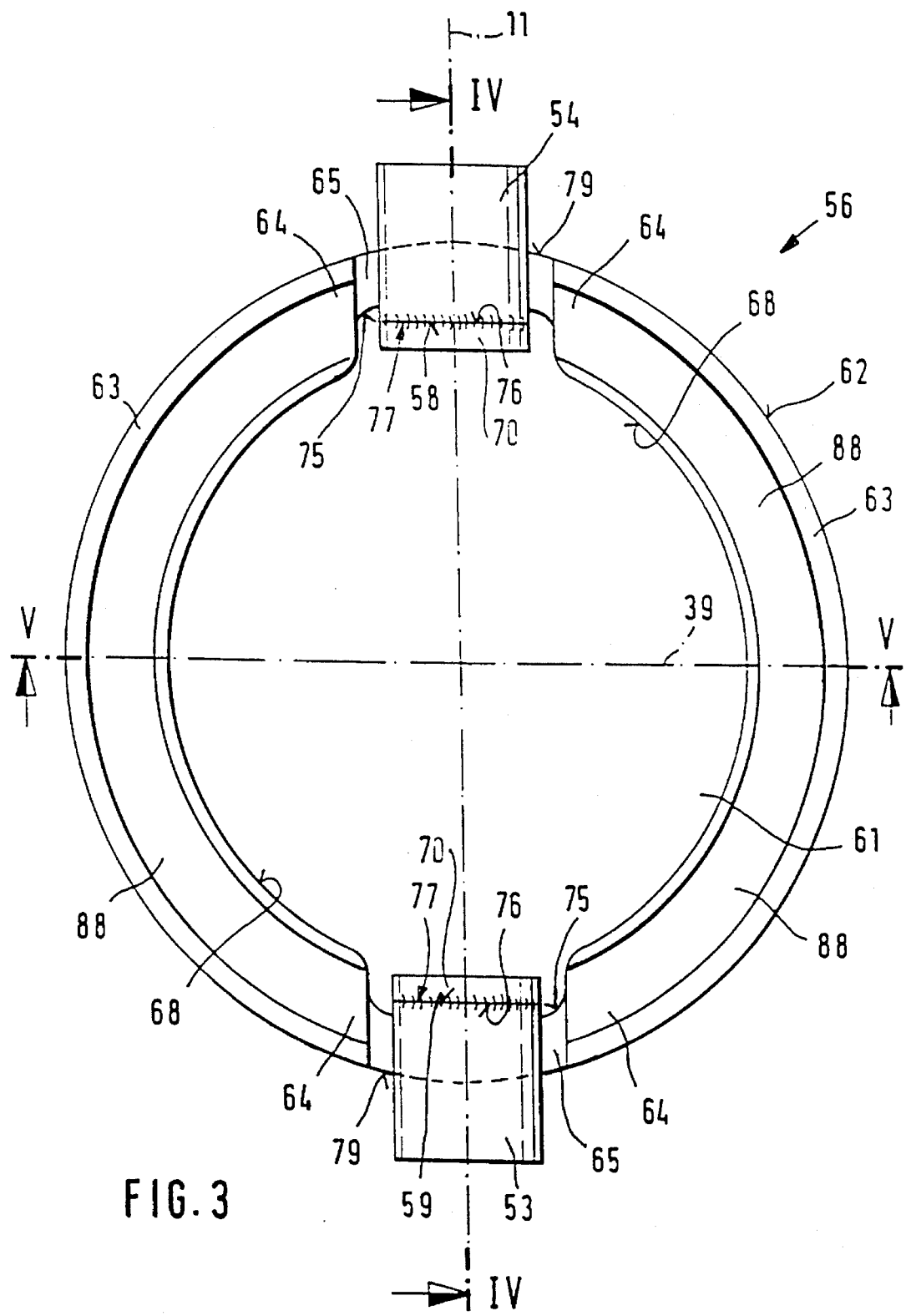
FIG. 3 is a top view of the insertion part with connected bearing arrangements.

FIG. 3 shows a top view of the insertion part 56 which is shown rotated about the axis of rotation 11 at the angle of inclination α in accordance with the installation position in the throttle-flap connection piece 2 and which assumes a circular shape in the representation of the projection of the top view according to FIG. 3. The angle of inclination α is drawn in FIG. 5 in a sectional representation along the line V—V of FIG. 3. The annular shape of the insertion part 56 is composed essentially of two elliptic ring pieces 63 arranged diametrically relative to the flow axis 40 and of two folding parts 65. The insertion part 56 has a mid-plane 60 which extends radially through the ring pieces 63 and through the middle of which pieces, measured in the axial direction, its thickness runs. The ring pieces 63 each circumferentially surround in half-shell form at a distance from the axis of rotation 11, on both sides, with their mutually opposite ring-piece ends 64 a gutter-shaped or U-shaped folding part 65 which is connected in one piece to the ring pieces 63. Each folding part 65 has two annular legs 69, projecting into the drawing plane in FIG. 3, and an annular bottom surface 71 which is limited by these and which extends at a distance parallel to the axis of adjustment 43 passing through the ring pieces 63. The bottom surfaces 71, with radial outer cylindrical surfaces 79, supplement outer radial cylindrical surfaces 62 and, with radial inner cylindrical surfaces 75, supplement inner radial cylindrical surfaces 68 of the ring pieces 63 to form the annular shape of the insertion part 56. The two folding parts 65 are divided symmetrically by a plane spanned by the axis of rotation 11 and the flow axis 40 and have, on the inner cylindrical surface 75, respective angular straps 70 which, starting from the bottom surface 71, extend upstream parallel to the flow axis 40 in the direction of the ring pieces 63 beyond a plane 67 which passes through the upstream surface of the ring pieces 63. In order to receive the actuating shaft 8 within the throttle-flap connection piece 2, the two straps 70 each have, in the vicinity of their free end, a passage orifice 72 which, in the injected state of the insertion part 56, is oriented centrally relative to the axis of rotation 11. The height of the straps 70, measured from the bottom surface 71 to the plane 67 formed by the ring pieces 63, is greater than the radius of the actuating shaft 8, in order to push the actuating shaft 8 into the passage orifices 72 without obstruction. According to the invention, the bearing arrangements 53, 54 are arranged on the straps 70, in particular are fixedly connected to these, for example by laser welding, in order to be jointly injected round with plastic during the injection operation. For the connection, in each case a semicircular boundary surface 78 of the strap 70, said surface facing the direction of flow 6 and projecting beyond the plane 67, is, for this purpose, connected by means of a welded joint 77 in each case to an upstream outer cylindrical surface 80 of the bearing arrangement 53, 54. The bearing arrangements 53, 54 bear against a strap surface 76 which faces away from the inner cylindrical surface 68 of the insertion part 56 and extend radially outwards along the folding part 65. During the injection operation, the insertion part 56 is arranged in the injection-molding die in such a way that the straps 70 and the folding parts 65 in the actuating part 24 and measuring part 25 of the throttle-flap connection piece 2 are encased by plastic. At the same time, the strap surfaces 76, pressed slightly against the two annular bearing end faces 58, 59, facing the suction duct 3, of the bearing arrangements 53, 54 prevent plastic from penetrating into the bearing arrangements 53, 54. In order to prevent plastic from penetrating on the opposite side of the bearing arrangements 53, 54 during the injection operation, the bearing end faces 83, 84 located there are sealed off by means of slides of the injection-molding die which bear against them.

For a further improvement in the dimensional stability of the throttle-flap connection piece 2 and to increase the roundness of the suction wall 20 in the pivoting region, particularly in the idling range of the throttle flap 4, the insertion part 56 possesses beads 88, 91 which are worked out as gutter-shaped depressions from the surface of the ring pieces 63 and which have, for example, a U-shaped cross section. The beads 88, 91 extend in a circumferential direction as far as the folding parts 65, advantageously the bead 88 directed opposite to the direction of flow 6 and with an inner limiting surface 89 or the bead 91 directed in the direction of flow 6 and with an inner limiting surface 92 extending in the immediate vicinity of, approximately parallel to, the inner cylindrical surface 68 of the ring piece 63 and being arranged with an outer limiting surface 90 of the bead 88 or with an outer limiting surface 93 of the bead 91 approximately parallel to the outer cylindrical surface 62 of the ring piece 63. A particularly good incorporation of the insertion part 56 into the plastic of the throttle-flap connection piece 2 takes place as a result of the beads 88, 91, since, during the curing of the plastic in the injection mold, a sliding of the plastic along the surface of the insertion part 56 is reduced by the beads 88, 91 and the plastic gains a grip on the limiting surfaces 89, 90, 92 and 93, with the result that a reduced shrinkage of the plastic is achieved, particularly in the case of an arrangement of the beads 88, 91 in the vicinity of the inner cylindrical surface 68 of the ring pieces 63, so that the roundness is improved in the region between the inner cylindrical surface 68 and the suction wall 20 or the cylindrical throttle portion 47.

The insertion part 56 is preferably produced as a sheet-metal bend-stamping, and the beads 88, 91 can be produced in a simple way in one production operation, for example by stamping, embossing or pressing. The thicknesses, measured in the direction of flow 6, of the ring pieces 63 and of the folding part 65 of the metal insertion part 56 are to be selected according to the desired rigidity of the throttle-flap connection piece 2.

Figure 4:
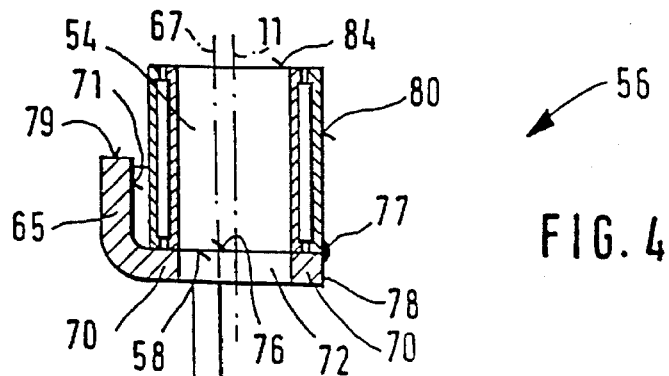
FIG. 4 is a section along a line IV—IV in FIG. 3
Figure 4:
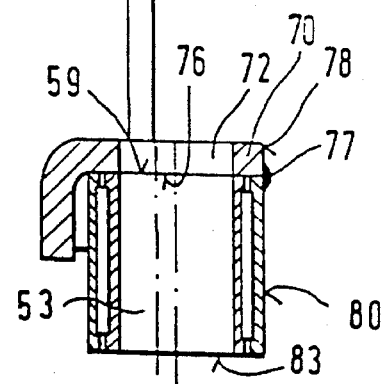

In order to incorporate the bearing arrangements 53, 54 well into the plastic, the bottom surface 71 of the folding part 65, as shown in FIG. 4, does not bear against the outer cylindrical surfaces 80 of the bearing arrangements 53 and 54, but an axial clearance is provided between the outer surface 80 and the bottom surface 71, so that this free interspace can be filled with plastic. A good embedding of the bearing arrangements 53, 54 into the plastic is also afforded in that the folding part 65 covers in the radial direction approximately half the outer surfaces 80 of the bearing arrangements 53, 54 and with the outer cylindrical surface 79 terminates at a radial distance from the bearing end faces 83, 84.

The insertion part 56 can also be produced from plastic, and as a plastic injection premolding it has a shape like that of the metal insertion part 56. If the bearing arrangements 53, 54 are sliding bearings, the bearing shells of the sliding bearings can, during the production of the plastic injection premolding, be inserted into correspondingly sleeve-shaped straps 70, radially lengthening the passage orifice 72, or be injection-molded on in a simple way.

The foregoing relates to preferred exemplary embodiments of the invention, it being understood that other variants and embodiments thereof are possible within the spirit and scope of the invention, the latter being defined by the appended claims.

We claim:

1. A throttle device with a throttle-flap connection piece having a suction duct, through which projects an actuating shaft which is mounted in the throttle-flap connection piece by means of two bearing arrangements and which is connected rotatably about an axis of rotation to a throttle member that controls the suction duct, wherein the throttle-flap connection piece (2) is designed as a plastic injection molding, into which an annular insertion part (56) is embedded transversely relative to the suction duct (3), and has angular straps (70), through which the actuating shaft (8) projects, and the straps (70) each bear with a strap surface (76) facing away from the throttle member (4) against a bearing end face (58, 59) of the bearing arrangement (53, 54) which faces the throttle member (4).

2. The throttle device as claimed in claim 1, wherein the insertion part (56) is composed essentially of two ring pieces (63) arranged diametrically relative to the suction duct (3) and of two gutter-shaped folding parts (65) connected in one piece to the ring pieces (63).

3. The throttle device as claimed in claim 2, wherein the straps (70) extend angularly from a bottom surface (71) of the folding part (65) beyond a plane (67) spanned by the ring pieces (63).

4. The throttle device as claimed in claim 3, wherein the insertion part (56) is fixedly connected by means of a boundary surface (78) of the straps (70) to an outer surface (80) of the bearing arrangements (53, 54).

5. The throttle device as claimed in claim 1, wherein the insertion part (56) is fixedly connected by means of a boundary surface (78) of the straps (70) to an outer surface (80) of the bearing arrangements (53, 54).

6. The throttle device as claimed in claim 4, wherein the straps (70) of the insertion part (56) are connected to the bearing arrangements (53, 54) by welding.

7. The throttle device as claimed in claim 1, wherein the insertion part (56) is designed as a sheet-metal part.

8. The throttle device as claimed in claim 1, wherein the insertion part (56) is designed as a plastic part.

9. The throttle device as claimed in claim 1, wherein the insertion part (56) is inserted transversely relative to the suction duct (3) in the throttle-flap connection piece (2) in a manner inclined at an angle of inclination α to a horizontal axis (39) which corresponds essentially to the inclination of the throttle flap (4) in the idling position.

10. The throttle device as claimed in claim 1, wherein the angle of inclination α is approximately 4 to 8 degrees.

11. The throttle device as claimed in claim 1, wherein the insertion part (56) has gutter-shaped depressions in the form of beads (88, 91).

12. The throttle device as claimed in claim 11, wherein the insertion part (56) is composed essentially of two ring pieces (63) arranged diametrically relative to the suction duct (3) and of two gutter-shaped folding parts (65) connected in one piece to the ring pieces (63), and the beads (88, 91) are arranged in half-shell form and extend approximately parallel to an inner cylindrical surface (68) of the ring pieces (63).

13. The throttle device as claimed in claim 12, wherein the beads (88, 91) are arranged with an inner limiting surface (89, 92) in the vicinity of the inner cylindrical surface (68) of the ring pieces (63).

14. The throttle device as claimed in claim 12, wherein the beads (88, 91) extend in the circumferential direction of the ring pieces (63) as far as the folding parts (65).

* * * * *